United States Patent [19]

Lowrance

[11] Patent Number: 4,622,274

[45] Date of Patent: Nov. 11, 1986

[54] BATTERY TERMINAL

[75] Inventor: Eugene S. Lowrance, Oakland, Calif.

[73] Assignee: Validec, Inc., San Carlos, Calif.

[21] Appl. No.: 719,322

[22] Filed: Apr. 3, 1985

[51] Int. Cl.⁴ .................. H01M 2/30; H01M 2/34
[52] U.S. Cl. .................................. 429/1; 429/158; 429/159
[58] Field of Search .................. 429/1, 100, 99, 98, 429/97, 124, 178, 156, 158, 159

[56] References Cited

U.S. PATENT DOCUMENTS 2,988,588  6/1961  Hartwig ........................ 429/100
3,553,033  1/1971  Page ............................ 429/178
3,967,979  7/1976  Kaye ............................ 429/99

Primary Examiner—Donald L. Walton
Attorney, Agent, or Firm—Flehr, Hohbach, Test, Albritton & Herbert

[57] ABSTRACT

A battery terminal and combined battery and terminal construction utilize a three-position contact arrangement in which the outer contacts are connected in common to provide correct contact to a set of mating contacts independent of the battery orientation. In one aspect, the terminal set is configured as a printed circuit board which is combined with a battery or battery pack.

5 Claims, 11 Drawing Figures

U.S. Patent  Nov. 11, 1986  4,622,274
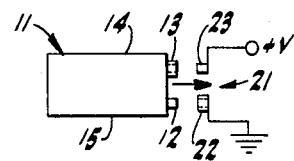
FIG-1
PRIOR ART
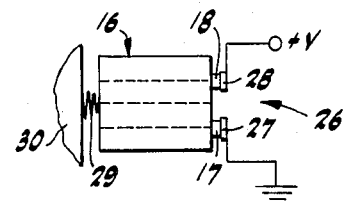
FIG-2
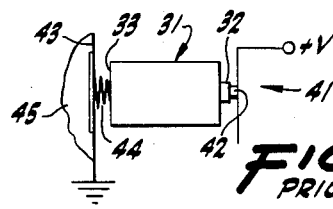
FIG-3
PRIOR ART
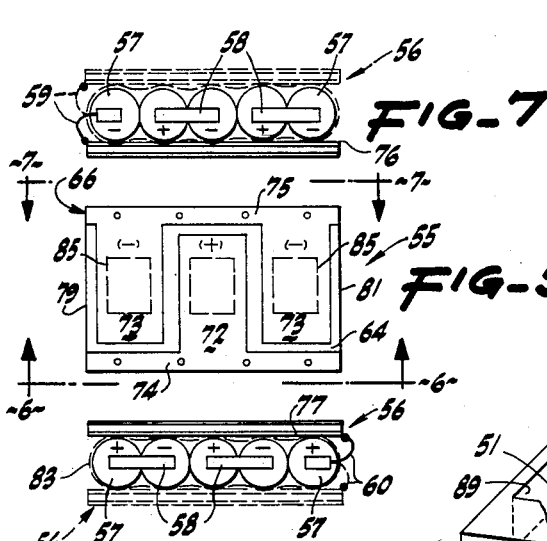
FIG-7
FIG-5
FIG-6
FIG-9
FIG-11
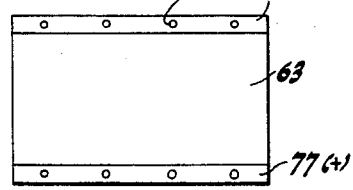
FIG-8
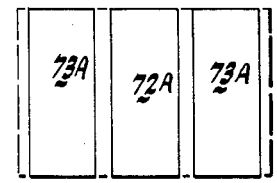
FIG-10

BATTERY TERMINAL

BACKGROUND OF THE INVENTION

The present invention relates to battery terminals used in flashlights, portable radios, communication terminals, model cars and other devices and, more particularly, to cooperating sets of terminals for the battery or battery pack and the receiving device which are configured to permit insertion of the battery into the device without regard to the orientation of the positive and negative terminals.

The conventional terminals which are used to connect a battery or battery pack to the electrical circuit of a receiving device such as a flashlight, radio, walky-talky, model car, etc., have only a single permissible orientation in which the positive and negative contacts of the battery are properly oriented to correspond to the positive and negative contacts of the receiving device. As a consequence, if the battery contacts are oriented improperly, positive to negative, relative to the receiving device, the receiving device will be inoperative and, in fact, the electrical circuitry of the device may be damaged.

An example of such a prior art arrangement is shown schematically in FIG. 1. There, a conventional battery 11 such as a transistor battery is adapted for connection to the electrical contact circuitry 21 of the receiving device. Battery 11 has negative and positive terminals 12 and 13 which form snap-in connections to the corresponding negative and positive terminals 22 and 23 of the receiving device. Quite obviously, proper physical and electrical connection is possible only when the battery is oriented so that positive terminal 13 is aligned with terminal 23 and negative terminal 12 with corresponding terminal 22. If, for example, the battery 11 is improperly oriented so that sides 14 and 15 are reversed, the opposite polarity terminals are brought into contact, rendering the device inoperative and possibly damaging it.

Another terminal arrangement is shown in FIG. 2 in the form of a battery pack 16 containing several individual batteries (shown in phantom) which are interconnected in series to negative and positive external terminals 17 and 18. In this case, the terminals do not form a coupling connection with the corresponding terminals 27 and 28 of device of circuit 26. Instead, a spring 29 is attached to the battery compartment wall 30 of the device to bias the terminals into engagement. Again, as in FIG. 1, there is only one proper orientation for the terminals. Positioning the battery with the terminals 17 and 18 reversed from their proper orientation prevents the receiving device from operating and may damage it.

Still another battery terminal arrangement is shown in FIG. 3. Here, the battery 31 is a standard flashlight cell in which the positive terminal or post 32 is located at the top of the battery and the base 33 provides ground contact. Receiving circuit 41 includes a positive terminal 42 at one end of the battery compartment and a ground terminal 43 at the opposite end. This arrangement is similar to that of FIG. 2 in that a spring 44 is mounted to battery compartment wall 45 to secure the battery 31 within the compartment. This arrangement is similar to that of FIGS. 1 and 2 in that there is only one proper orientation for the positive and negative terminals. However, the arrangement differs from that shown in FIGS. 1 and 2 in that proper orientation is obtained by switching a battery end-for-end rather than from side-to-side. In addition, the battery of FIG. 1, for example, can be inserted into the receiving battery compartment in four different orientations, only one of which is correct, whereas only two total orientations and one incorrect orientation are possible for the arrangement of FIG. 3.

The potential for incorrect, possibly damaging misorientation is perhaps only a minor inconvenience where batteries are replaced infrequently and in adequate ambient light. However, this situation can become more than a minor annoyance where a number of devices are used and/or battery replacements are frequent and/or battery replacement is done in low ambient light where correct orientation is not easily determined.

In view of the above situation, it is an object of the present invention to provide a battery terminal or contact arrangement in which correct positive-to-positive and negative-to-negative connections are made independently of the orientation of the battery contacts and the contacts of the receiving device.

It is another object of the present invention to provide a battery terminal arrangement which uses interdigitated battery and receiving terminals which permit the terminals to be reversed end-for-end without altering the contact polarity. As a result, proper polarity contact is always made between the battery and the receiving device.

It is still another object of the present invention to provide a battery terminal arrangement which includes interdigitated battery and receiving terminals and in which the battery terminals are provided on both sides of the battery. As a result, the battery can be reversed end-to-end or side-to-side without altering the contact polarity. Contact between the battery and the receiving device is, thus, completely independent of the orientation of the battery.

SUMMARY OF THE INVENTION

The present invention includes a terminal construction for an electric power supply such as a battery or battery pack, and a mating circuit. The battery and the circuit each have a set of terminals or contacts which are adapted to the same three equally spaced contact positions along a generally linear axis. In one aspect, each of the battery and the circuit has a set of terminals which consist of three terminals corresponding to the equally spaced contact positions. The two outer or end terminals are connected in common to a first voltage such as the positive or ground battery voltage, whereas the inner terminal is connected to the other of the ground/positive battery voltages. This terminal design is independent of orientation in that the battery always makes proper contact to the correct circuit terminal. That is, the battery can be switched end-to-end without affecting proper contact with the mating circuit in the receiving device.

Correct, automatic orientation is still maintained even when one of the end terminals is omitted from the battery or device circuit. In another aspect, the terminals can take various constructions, including spring terminals or flat terminals.

In a presently preferred working embodiment, the battery terminal set is a printed circuit board which is mounted to or part of the battery pack. A pair of conductors are plated on the inner major surface of the printed circuit board adjacent to the batteries and are connected to the positive and ground terminals of the battery pack. Three interdigitated conductors are plated on the outer major surface corresponding to the three contact positions. The two end conductors are connected to one of the inner surface conductors, whereas the center conductor is connected to the second inner conductor. In this way, the outer/center terminals are connected to the positive/ground battery voltages.

Alternatively, a second set of terminals can be found on the opposite side of the battery or battery pack so that proper contact is made to the receiving device if the battery is reversed side-to-side.

Although interdigitated battery terminals are preferred because they reduce the number of contacts between the battery and the outer terminals of the battery terminal set, individual contacts can be used.

BRIEF DESCRIPTION OF THE DRAWINGS

The above and other aspects of the present invention are described in the accompanying drawing, in which:

FIGS. 1–3 are schematic illustrations of conventional, orientation-sensitive battery-to-circuit terminal arrangements;

FIG. 4 illustrates a battery compartment of a device having terminals constructed in accordance with the present invention;

FIGS. 5–7 are, respectively, a top plan view, a front view and a rear view of a battery pack containing terminals constructed in accordance with the present invention;

FIGS. 8 and 9 are, respectively, a bottom plan view and an end view of the printed circuit board terminal shown in FIG. 5; and FIGS. 10 and 11 are alternative configurations for the device terminals and battery terminals shown in FIGS. 4 and 5.

DETAILED DESCRIPTION OF THE PREFERRED EMBODIMENT

As used here, the individual terms electric power supply, battery and battery pack include the other terms.

FIG. 4 illustrates one example of a device 50—actually the bottom side of the device—which uses the present invention. The device 50 is a hand-held communications terminal of the type disclosed in commonly assigned co-pending U.S. application in the name of Charles P. Thacker et al, U.S. application Ser. No. 655,019, filed Sept. 26, 1984, entitled "AUTOMATED ORDERING AND ACCOUNTING SYSTEM". In one application, a number of the hand-held terminals 50 are carried by the waitstaff in a restaurant for conveying orders to and receiving, for example, confirming and billing information from, a host central computer. Use is frequently required in low ambient light conditions, the hand-held terminals are in constant use and, consequently, battery replacement is fairly frequent and must be undertaken in the low ambient lighting to avoid service interruptions. While device 50 and the related system are not part of the present invention per se, they are mentioned here as an excellent illustration of an application where the present invention is helpful.

Referring still to FIG. 4, device 50 includes a rectangular battery compartment 51 which is shown with the battery compartment lid removed. The battery compartment contains a row of three terminals 52 and 53 which are spaced approximately equal distances from one another. As is well known, such terminals can be leaf springs, or coil springs, etc. The terminals connect to and drive the internal electric circuitry of the hand-held terminal device 50, including an on-board microprocessor and a display lighting circuit. The center terminal 52 is adapted internally (not shown) to connect to a first voltage level, for example ground, whereas the two outer spring contacts 53—53 are connected in common to a second voltage level, for example a positive voltage +V. The critical aspect of the battery compartment terminals is the three-position contact design.

Referring now to FIGS. 5, 6 and 7, there is shown a battery pack 55 which is adapted for insertion into the battery compartment 51, FIG. 4. The battery pack 55 includes a printed circuit board terminal set 56 which is attached to the battery pack 55 by adhesive or otherwise, to one of the two "flat" sides of the battery pack. The terminal set 56 is adapted to mate with the device circuit terminals 53-52-53 independent of orientation. In particular, the battery pack 55 includes a flat array of a plurality (illustratively 5) of batteries 57—57. Here, the adjacent positive and ground terminals of the batteries are connected by straps 58—58 in a series connection, and the end ground and positive terminals are connected by leads 59 and 60, to the respective ground and positive terminals 76 and 77 of the battery pack's printed circuit board terminal set 56.

As shown in FIGS. 5, 8 and 9, the battery printed circuit board terminal 56 includes a flat insulative printed circuit board 62 having conductors formed on both major surfaces, that is, on the inner surface 63 adjacent the battery array or pack, and on the outer surface 64. It should be noted that the dimensions of the illustrated battery pack are not precisely to scale. In particular, the cross-sectional thickness dimensions of the board and conductors are exaggerated in FIGS. 6, 7 and 9 to facilitate understanding. The terminal array 66 on the outer surface comprises a set of interdigitated conductors or fingers which correspond and mate to the three-position contact arrangement of the device battery compartment 51, FIG. 4. Specifically, the outer terminal set 66 includes a pair of end conductor terminals or fingers 73—73 which are plated on or otherwise affixed to the outer surface 64 of the board 62. The two terminals 73 are connected by a longitudinal conductor member 75, illustratively formed as a unitary conductor construction with the terminals 73—73. An interdigitated center conductor terminal or finger 72 is also attached to the board outer surface 64, as by plating, and is electrically separate from the fingers 73—73. The center terminal 72 is connected to a longitudinal electric conductor member 74 which illustratively forms a unitary conductor construction with that terminal.

As shown most clearly in FIG. 8, a pair of longitudinal conductors 76 and 77 are plated or otherwise attached to the inner board surface 63 and are connected, for example, by plated through-holes 78—78 to the respective associated end terminal array 73,75 and to the center terminal array 72, 74. The conductors 76 and 77 are also connected by the leads 59 and 60 to the ground and positive battery terminals, thus, completing connection of the end terminals 73 to the ground battery terminal and the center terminal 72 to the positive battery terminals.

As mentioned, the battery compartment 51 is of the same rectangular configuration as the battery pack 55 and is slightly larger than the battery pack so that the battery pack terminals 72 and 73 are precisely aligned with the battery compartment terminals 52 and 53 when the battery pack is inserted into the device. The three terminal arrangement in which the outer terminals are connected to the same voltage provides the proper terminal connection regardless of whether the battery pack is inserted with ends 79 and 81 (FIG. 5) corresponding to the battery compartment ends 89 and 91, or is switched end for end so that battery ends 81 and 79 correspond to 89 and 91. Also, the independence from orientation and proper contact is still provided if an end terminal is deleted from either the battery compartment set or battery pack set. In addition to the freedom from dependence on orientation which is provided by the three-position terminal design, the elongated, wide terminals 72 and 73 permit the use of essentially point contact mating terminals 52 and 53, and ensure proper contact between the corresponding terminals without precise alignment.

As shown in phantom in FIGS. 6 and 7, a second printed circuit board terminal set 56 can be attached to the battery pack 55 on the second flat face of the battery pack, i.e., on the opposite side of the battery pack. The terminals 72 and 73 (not shown) of the second terminal set are connected to the same battery polarities as the first terminal set, that is, with the outer terminals 73 at negative polarity or ground, and with the inner terminal at +V. As a consequence, the battery pack provides the proper terminal contact to the battery compartment, despite being switched from side-to-side and/or end-to-end. In short, the two terminal sets 56—56 provide the proper contact to the battery compartment terminals with complete independence from the orientation of the battery pack.

Various other modifications and additions to the above terminal configuration are within the spirit and scope of the present invention. For example, the battery pack can be covered with insulation such as the heat shrinkable insulation shown in phantom outline 83 in FIG. 6, or the three-position terminal set 66 can be covered with an adhesive insulating layer which has openings therein shown in phantom outline 85—85 in FIG. 5 which correspond to the positions of the battery compartment terminals 52 and 53. Alternatively, or in addition, the conductors 72 and 73 can be formed with a raised portion which corresponds to the contact locations 85. Referring to FIGS. 10 and 11, one or both of the battery compartment terminals and the battery pack terminal set can be constructed as the separate elongated terminals 72A and 73A in FIG. 10, or the separate circular contacts 72B and 73B shown in FIG. 11. In either case, it may be advisable to attach springs or resilient material to the battery compartment lid to bias the battery pack terminals into contact with the battery compartment terminals. Also, the FIG. 10 and 11 embodiments are not unitary (in contrast to terminals 73, FIG. 5) and, thus, require an individual battery connection to each end terminal 73. Of course, various other alterations and additions are possible.

Having thus described a preferred and alternative embodiments of the present invention, what is claimed is:

1. A battery pack comprising: an array of at least one battery having two terminals and defining first and second, opposite faces; and a terminal set comprising:
    a flat insulative body mounted to the first face of said battery array, and having two major opposite surfaces, one being an inner surface facing the battery array and the other being an outer surface;
    a pair of conductors formed on the inner surface of the insulative body adjacent the battery array and being connected, respectively, to the separate ones of the two battery terminals; and
    three interdigitated terminals formed on the outer major surface of the insulative body, the body, the end terminals being connected in common to one of the inner surface conductors and the center terminal being connected to the second of the inner surface conductors.

2. A battery pack comprising: an array of at least one battery having two opposite polarity terminals and defining first and second, opposite faces; and first and second terminal sets mounted, respectively, to the first and second faces of the battery, each terminal set comprising:
    a flat insulative body having two major opposite surfaces, one surface being an inner surface facing the battery array and the other being an outer surface;
    a pair of conductors formed on the inner surface of the insulative body adjacent the battery array and being connected, respectively, to the two battery terminals; and
    an array of three interleaved terminals formed on the outer surface of the insulative body, including: (a) a generally U-shaped conductor comprising two spaced arms and a connecting base aligned with and opposite said first conductor, the arms thereof forming a pair of end terminals of the array; and (b) a generally T-shaped conductor comprising interconnected upright and cross-bar members, the upright being interleaved with and electrically separate from the arms of the U-shaped conductor and the cross-bar being aligned with and opposite said second conductor; the end terminals thereof being connected in common to one of the inner surface conductors and the center terminal being connected to the second of the inner surface conductors.

3. The battery pack of claim 1 or 2 further comprising a second said terminal set mounted on the second face of the battery.

4. A battery pack comprising: a generally flat array of batteries having two opposite polarity terminals and defining first and second, opposite major faces; and a printed circuit board terminal set comprising:
    a flat insulative body mounted to the first face of the battery array and having two major surfaces, an inner surface facing the battery array and an outer surface;
    first and second conductors extending along adjacent opposite ends of the inner surface of the insulative body connected to separate ones of the two battery terminals;
    an array of three interleaved terminals formed on the outer surface of the insulative body, including: (a) a generally U-shaped conductor comprising two spaced arms and a connecting base aligned with and opposite said first conductor, the arms thereof forming a pair of end terminals of the array; and (b) a generally T-shaped conductor comprising interconnected upright and cross-bar members, the upright being interleaved with and electrically separate from the arms of the U-shaped conductor and the cross-bar being aligned with and opposite said second conductor;

plated through-hole means for connecting said first conductor through said insulative body to the base of the U-shaped conductor for connecting the arms thereof in common with a first one of the opposte polarity battery terminals; and plated through-hole means for connecting said second conductor through said insulative body to the cross-bar of the T-shaped conductor for connecting the upright thereof in common with the second battery terminal.

5. The construction of claims 1, 2 or 4 wherein said end and center terminals are covered by a layer of insulating material having openings therein permitting contact to the terminals.

* * * * *